United States Patent Office 2,904,570
Patented Sept. 15, 1959

2,904,570

HYDROCARBONTIN DERIVATIVES OF TRIS-MERCAPTO BORATE ESTERS

Hugh E. Ramsden, Scotch Plains, N.J., assignor to Metal & Thermit Corporation, New York, N.Y., a corporation of New Jersey No Drawing. Application March 27, 1956
Serial No. 574,091

16 Claims. (Cl. 260—429.7)

The present invention relates to organotin derivatives of tris-mercapto borate esters, having utility as stabilizing agents for resins and the like, particularly for halogen-containing materials, and to processes for manufacturing the same. This application is a continuation-in-part of U.S. application Serial No. 295,550, filed June 25, 1952, and now abandoned.

In accordance with the invention, the new group or organotin derivatives of tris-mercapto borate esters may be generally designated as condensation products of organotin compounds with tris-mercapto alkyl or aryl borates.

The products of the present invention vary considerably as to their degree of polymerization. Simple monomers are illustrated by the following formulas:

(1)                [RSn][(SR'O)$_3$B]

(2)                [R$_2$Sn]$_3$[(SR'O)$_3$B]$_2$ (3)                [R$_3$Sn][(SR'O)$_3$B]

wherein R is an alkyl, cycloalkyl, alkenyl, aryl or aralkyl group and R' is an aliphatic or aromatic divalent radical and where the free valences on the tin atoms are joined to the free valences on the sulfur atoms. The Sn—S bond are believed to be covalent rather than ionic because the products are in general quite soluble in organic solvents. R may be, for example, any organic radical such as methyl, ethyl, propyl, butyl, hexyl, octyl, lauryl, vinyl, allyl, isocrotyl, methallyl, cyclohexyl, phenyl, tolyl, benzyl, phenylethyl, p-chlorobenzyl, etc. Similarly, R' may be derived from any borate ester of a mercapto alcohol or mercaptophenol. The preferred alcohols are the 1, 2 or 1, 3 mercapto alkanols. The radicals R and R' in the above formulas may carry any substituents which are unreactive, under the conditions of reaction, with the reactants and reaction products of the processes employed in the preparation of the present organotin tris-mercapto borate esters and which do not deleteriously effect the stabilizing properties of these organotin tris-mercapto-borate esters with respect to the halogen-containing resins.

The products are probably polymeric in most cases. Their physical properties suggest this and the possibility of polymer formation inheres in the polyfunctionality of both the organotin residues and the tris-mercapto borate ester residues. Since the latter are trifunctional, many arrangements are possible in the polymer molecule.

These compounds may be prepared in any suitable manner. It has been found, however, that these products may be prepared in high yield and purity by reacting an organotin compound with a tris-mercapto alkyl or aryl borate ester and recovering a reaction product having the desired Sn—S linkage. More specifically, organotin oxides, organotin hydroxides or organo stannoic acids may be condensed with a tris-mercapto alkyl or aryl borate to produce products of the present invention.

The reactions for the formation of the aforesaid tris-mercapto borates is clearly illustrated by the following equations:

(4)   RSnOOH+B(OR'SH)$_3$→RSn(SR'O)$_3$B+2H$_2$O (5)   3R$_2$SnO+2[B(OR'SH)$_3$]
                         →(R$_2$Sn)$_3$[(SR''O)$_3$B]$_2$+3H$_2$O (6)   3R$_3$SnOH+B(OR'SH)$_3$
                         →[R$_3$Sn]$_3$[(SR'O)$_3$B]+3H$_2$O

These equations show that the reaction occurs between the mercapto radical and the oxo and/or the hydroxy radicals of the tin reactant whereby water splits off and a chemical bond is formed between the tin and the sulfur in the formation of a seemingly polymeric viscous liquid. They further illustrate the necessary molecular ratio of the mercapto compound to the organotin reactant in order to obtain the desired reaction. Although an excess of either reactant may be maintained, stoichiometric amounts thereof are preferred.

The tris-mercapto borate esters utilized in the formation of the organotin derivatives thereof are prepared by reacting boric acid with a mercapto alcohol according to the following equation:

$$H_3BO_3+3(HSR'OH)\rightarrow B(OR'SH)_3+3H_2O$$

Any mercapto alcohol capable of reacting with the boric acid to form the borate is utilizable in the present invention. However, the 1, 2 and 1, 3 mercapto alcohols are preferred. Examples of suitable mercapto alcohols utilizable in the present invention are mercaptoethanol, o-mercaptophenol, p-mercaptophenol, o-mercaptobenzyl alcohol, p-hydroxybenzyl mercaptan, β-phenyl-β-mercaptoethanol, 2-mercaptopropanol-1, 3-mercaptopropanol-1, 1-mercaptopropanol-2, 2-mercaptobutanol-1, 5-mercapto-n-pentanol, 2-mercapto n-octanol, 4-mercaptobutanol, etc.

It is within the scope of this invention that pure, impure or commercial grades of the reactants may be employed satisfactorily. In general, pure compounds of the above formulas may be prepared from pure raw materials. However, these novel compounds may be diluted with inocuous, inert materials, thereby permitting the use of technical materials or intermediates in their preparation.

Any suitable reaction temperatures may be employed. It is ordinarily preferred to use lower temperatures. However, the presence of the water produced by the condensation reaction usually requires an additional heating or refluxing in order to strip said water from the reaction product, though it may be removed in any other suitable manner.

Another embodiment of this invention is the use of inert organic solvents as the medium for the reaction, such as toluene, benzene, etc. The presence of such solvent facilitates the desired reaction and the removal of water of reaction. The solvent may be eliminated from the reaction product at the completion of the reaction by any suitable means. This may be accomplished usually by vaporizing the solvent under vacuum at elevated temperatures.

The following examples are further illustrative of these novel organotin derivatives of tris-mercapto borate esters and their preparation, and it will be understood that the invention is not limited thereto:

EXAMPLE I 52 gms. boric acid (1 mole), 234 gms. mercapto ethanol (3 moles), and 100 ml. of toluene are stirred and heated under reflux until all the water of reaction is removed by means of a Barrett water trap. The mixture is subsequently stripped free of toluene under a water jet vacuum to a final pot temperature of 160° C. and a pressure of 15 mm. Hg. The residue, tris-mercapto-ethyl borate $(SHC_2H_4)_3BO_3$ is a free flowing liquid of very light color.

186.5 g. dibutyltin oxide (0.75 mole), 120.9 g. tris-mercapto-ethyl borate (0.5 mole), and 200 ml. toluene are stirred and heated under reflux until all the reaction water is removed. The mixture becomes extremely viscous as the last traces of water are removed. The mixture is poured hot into a stainless steel beaker and the last traces of solvent are removed by placing the beaker in a vacuum oven until a constant weight is obtained. The final product, dibutyltin derivative of tris-mercapto-ethyl borate, is an extremely viscous light colored liquid having the following chemical analysis: sulfur 16.0%, Sn—29.2%, boron 2.2%. The product was tri(dibutyltin) di(S,S',S" tris-mercapto-ethyl borate).

EXAMPLE II

Three moles of diphenyl-tin oxide and two moles of tris-mercapto-ethyl borate are heated in the presence of toluene under reflux until all the water of reaction is removed. The solvent is then removed by heating in vacuo, thus yielding a viscous liquid tri(diphenyl-tin) di(S,S',S" tris-mercaptoethyl borate).

EXAMPLE III

Three moles of di-methyl-tin oxide and two moles of p-mercaptophenyl borate are heated in the presence of toluene under reflux until all the water of reaction is removed. The solvent is then removed by heating in vacuo, thus yielding a viscous liquid tri[dimethyltin]-di(S,S',S" tris-mercaptophenyl borate).

EXAMPLE IV

Three moles of diphenylethyltin oxide and two moles of β-phenyl-β-mercaptoethyl borate are heated in the presence of toluene under reflux until all the water of reaction is removed. The solvent is then removed by heating in vacuo, thus yielding a viscous liquid tris (diphenyl-ethyltin) di(S,S',S" tris - β - phenyl - β - mercaptoethyl borate).

EXAMPLE V

Three moles of dilauryltin oxide and two moles of o-mercaptomethylphenyl borate are heated in the presence of toluene under reflux until all the water of reaction is removed. The solvent is then removed by heating in vacuo, thus yielding a viscous liquid, tri(dilauryltin) di-(S,S',S" tris-o-mercaptomethylphenyl borate).

EXAMPLE VI

One mole (228.7 g.) of phenylstannoic acid) one mole of tris-mercaptoethyl borate (241.8 g.), and 350 ml. of toluene by the process of Example I, yield phenyltin S,S',S"(trismercaptoethyl borate).

EXAMPLE VII

Similarly to Example VI, n-octylstannoic acid, tris-o-mercaptophenyl borate, and toluene yield n-octyltin S,S',S"(tris-o-mercaptophenyl borate).

EXAMPLE VIII

By the process of Example VI, vinylstannoic acid and tris mercaptoethyl borate yield vinyltin S,S',S"(tris-mercaptoethyl borate).

EXAMPLE IX

By the process of Example VI, benzylstannoic acid and tris(-p-mercaptomethylphenyl) borate yield benzyltin S,S',S" (tris-[p-mercaptomethylphenyl] borate).

EXAMPLE X

Tri-p-tolyltin hydroxide and tris(-2-mercaptooctyl) borate by the process of Example VI, yield a fairly fluid product tris [(tri-p-tolyl)]tin S,S',S"[tris-(2-mercaptooctyl) borate].

EXAMPLE XI

Tricyclohexyltin hydroxide and tris(-2-mercaptopropyl) borate yield, by the process of Example VI tri(tricyclohexyltin) S,S',S" [tris(-2-mercaptopropyl) borate].

EXAMPLE XII

Triisocrotyltin hydroxide and tris(p-mercaptomethylphenyl) borate yield, by this process, tris(triisocrotyltin) S,S',S" [tris(-p-mercaptomethylphenyl) borate].

EXAMPLE XIII

Tris(p-chlorobenzyl) tin hydroxide and tris(4-mercaptobutyl) borate yield tris[tri(p-chlorobenzyl) tin] S,S',S" [tris(4-mercaptobutyl) borate].

The aforesaid novel organotin derivatives are useful as resin stabilizers, chlorinated composition stabilizers and the like, as rubber accelerators, rubber anti-oxidants, oil additives and polymerization accelerators.

It has also been discovered and is a feature of this invention that the novel organotin derivatives of tris-mercapto borates will function as excellent stabilizers for resin compositions, particularly vinyl chloride containing resin compositions with plasticizers, and when intimately dispersed therein, will provide plastic compositions of improved resistance to heat deterioration. Excellent films are obtained from the aforesaid plastic compositions which exhibit a high degree of stability. The optimum concentration of the aforesaid organotin derivatives, useful as a stabilizer is about 1–2% based on the weight of the vinyl resin. The resin composition containing this concentration of stabilizer produces a stable plastic film which does not darken at elevated temperatures as evidenced by the results of the heat tests of Table I.

The vinyl resins employed were polyvinyl chloride resins. The stabilizer was incorporated into a mixture of 100 parts by weight of resin and 50 parts by weight of 2-ethylhexyl phthalate plasticizer.

The mixture was then milled for 5 minutes on a two-roll differential speed mill heated to 320 to 325° F., and removed as a sheet. Portions of the sheet were then placed in a single cavity mold (6" x 6" x 40 mils), which had been preheated to 275° F. The mold was placed on a Preco press and raised to 320° F. under 10,000 pounds total pressure. When the mold reached 320° F. the pressure was increased to 40,000 pounds and held until the temperature reached 330° F. This procedure required five to five and one-half minutes. The mold and press platens were then cooled and the pressed sheet removed.

The pressed sheet was cut into one inch by six inch strips and placed in clips on a tray so that the strips would hang vertically. The tray was then placed in a circulating air oven held at 320° F. Samples were recovered after one hour, two hours, three hours and four hours of heat ageing. Samples were rated visually, the degree of stability of the vinyl chloride resin film being represented by the depth of colorations.

*Table I*

| Stabilizer | Color | | | |
|---|---|---|---|---|
| | 1 hr. | 2 hrs. | 3 hrs. | 4 hrs. |
| None | Reddish brown. | Black | | |
| 2% product of Example 1. | Colorless | Colorless | Colorless | Slightly yellow. |

This table discloses the unusual stabilizing activity of the novel organotin derivatives of the mercapto borates, in comparison with a resin without such stabilizer.

While the invention has been described with reference to various examples and embodiments, it will be apparent to those skilled in the art that various modifications may be made, and equivalents substituted therefor,

What is claimed is:

1. A compound having the formula [RSn]B(OR'S)$_3$ wherein R is selected from the group consisting of alkyl, cycloalkyl, alkenyl, aryl and aralkyl radicals and R' is selected from the class consisting of divalent aliphatic hydrocarbon and divalent aromatic hydrocarbon radicals, and where each tin atom is bonded to three sulfur atoms.

2. A compound having the formula:

$$[R_3Sn]_3[(SR'O)_3B]$$

wherein R is selected from the group consisting of alkyl, cycloalkyl, alkenyl, aryl and aralkyl radicals and R' is selected from the class consisting of divalent aliphatic hydrocarbon and divalent aromatic hydrocarbon radicals and where each tin atom is bonded to a sulfur atom.

3. As a new compound, a hydrocarbontin derivative of a tris-mercapto borate ester wherein each tin atom is bonded to sulfur.

4. A compound having the formula:

$$(R_2Sn)_3[B(OR'S)_3]_2$$

wherein R is selected from the group consisting of alkyl, cycloalkyl, alkenyl, aryl and aralkyl radicals, and R' is selected from the class consisting of aliphatic and aromatic divalent hydrocarbon radicals, and where each tin atom is bonded to two sulfur atoms.

5. A compound having the formula:

$$(R_2Sn)_3[B(OR'S)_3]_2$$

wherein R is an alkyl radical and R' is an aliphatic divalent hydrocarbon radical and where each tin atom is bonded to two sulfur atoms.

6. A compound having the formula:

$$(R_2Sn)_3[B(OR'S)_3]_2$$

wherein R is an aryl radical, and R' is an aliphatic divalent hydrocarbon radical and where each tin atom is bonded to two sulfur atoms.

7. Tri(dimethyltin) di(S,S'S" tris-mercaptoethyl borate).

8. Tri(dibutyltin) di(S,S'S" tris-mercaptoethyl borate).

9. Tri(diphenyltin) di(S,S'S" tris-mercaptoethyl borate).

10. A method of preparing hydrocarbontin tris-mercapto borate esters which comprises reacting a hydrocarbontin compound with a tris-mercapto borate ester, and recovering said hydrocarbontin tris-mercapto borate ester.

11. A method of preparing hydrocarbontin tris-mercapto borate ester which comprises reacting a hydrocarbontin oxide with a tris-mercapto borate ester, and recovering said hydrocarbontin tris-mercapto borate ester.

12. A method of preparing hydrocarbontin tris-mercapto alkyl borates, which comprises reacting a hydrocarbontin oxide with a tris-mercapto alkyl borate and recovering said hydrocarbontin tris-mercapto alkyl borate.

13. A method of preparing hydrocarbontin tris-mercapto aryl borate, which comprises reacting a hydrocarbontin oxide with a tris-mercapto aryl borate and recovering said hydrocarbontin tris-mercapto aryl borate.

14. A method of preparing hydrocarbontin tris-mercapto borate esters which comprises reacting a hydrocarbontin oxide with a tris-mercapto borate ester in the presence of an inert organic solvent, and recovering said hydrocarbontin tris-mercapto borate.

15. A method of preparing hydrocarbontin tris-mercapto borate esters which comprises reacting stoichiometric amounts of a hydrocarbontin oxide and a tris-mercapto borate ester, and recovering said hydrocarbontin tris-mercapto borate.

16. A method of preparing dibutyl tin derivative of tris-mercaptoethyl borate which comprises reacting stoichiometric amounts of dibutyl tin oxide and tris-mercapto ethyl borate, and recovering dibutyl tin derivative of tris-mercaptoethyl borate.

References Cited in the file of this patent

UNITED STATES PATENTS

| | | |
|---|---|---|
| 2,554,142 | Grimmith | May 22, 1951 |
| 2,592,311 | Meyer et al. | Apr. 8, 1952 |
| 2,648,650 | Weinberg et al. | Aug. 11, 1953 |
| 2,727,917 | Mack | Dec. 20, 1955 |
| 2,762,821 | Walde | Sept. 11, 1956 |